United States Patent [19]
Weisz

[11] Patent Number: 5,935,446
[45] Date of Patent: Aug. 10, 1999

[54] METHOD AND A DEVICE FOR PURIFYING WATER

[76] Inventor: Robbert M. H. H. Weisz, Potgieterstraat 23, 6416 SM, Heerlen, Netherlands

[21] Appl. No.: 08/860,909

[22] PCT Filed: Jan. 9, 1996

[86] PCT No.: PCT/NL96/00017

§ 371 Date: Oct. 3, 1997

§ 102(e) Date: Oct. 3, 1997

[87] PCT Pub. No.: WO96/21520

PCT Pub. Date: Jul. 18, 1996

[30] Foreign Application Priority Data

Jan. 11, 1995 [NL] Netherlands ............................ 9500048

[51] Int. Cl.⁶ .................................................... C02F 1/24
[52] U.S. Cl. ........................ 210/703; 210/805; 210/806; 210/196; 210/195.1; 210/221.2; 210/295
[58] Field of Search ................................... 210/703, 805, 210/806, 295, 221.2, 221.1, 196, 194, 195.1

[56] References Cited

U.S. PATENT DOCUMENTS 3,012,670 12/1961 Ziemer .
4,431,531 2/1984 Hollingsworth .
4,610,785 9/1986 Russell .
4,851,036 7/1989 Anthes .

FOREIGN PATENT DOCUMENTS 065382 11/1982 European Pat. Off. .
9313340 U 1/1994 Germany .
60-35094 2/1985 Japan .
2-218489 8/1990 Japan .

Primary Examiner—Thomas M. Lithgow
Attorney, Agent, or Firm—Skjerven, Morrill, MacPherson, Franklin & Friel, LLP; Alan H. MacPherson; Elaine H. Lo

[57] ABSTRACT

The invention relates to a method and a device for purifying water used for forming a water curtain of a wet spray wall in paint spray and/or glue processing booths, wet dust removal plants and the like. The water to be purified is caught in a receptacle (1) and the water is sucked out under the surface of the water present in said receptacle (1), mixed with air and introduced into a basin (14) at the bottom side of said basin (14). The water mixed with air is introduced into a basin (14) which widens in upward direction, and contaminations floating on the surface of the water present in said basin (14) are pushed towards an outlet disposed near one side of said basin (14) by means of a pusher, whilst the water flows out on the opposite side of the basin via an overflow. A few perforated plates disposed one above the other are provided in the basin (14) whose sectional area gradually increases in upward direction.

21 Claims, 6 Drawing Sheets

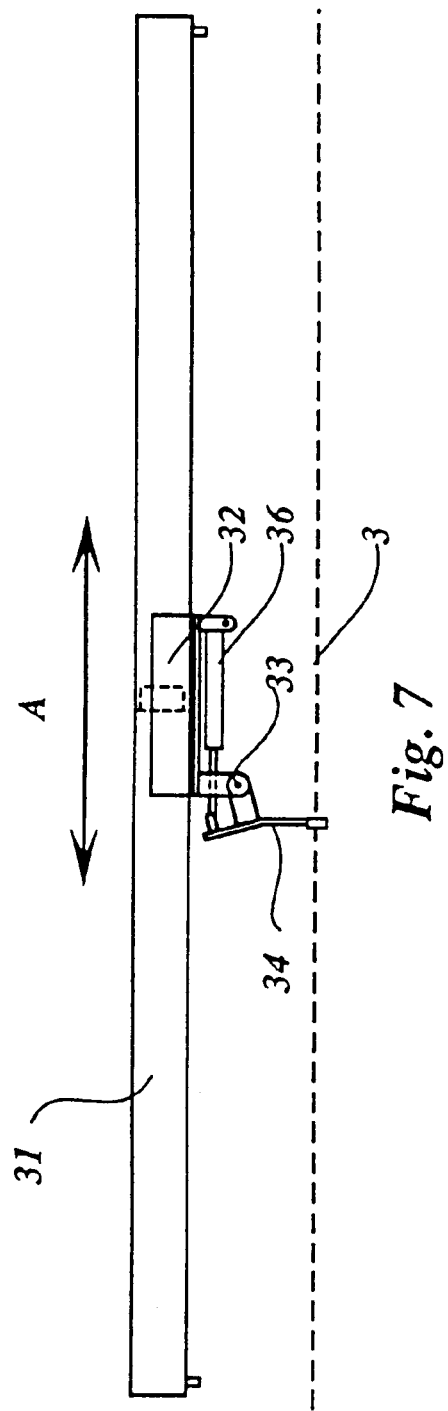
Fig. 7
Fig. 8

METHOD AND A DEVICE FOR PURIFYING WATER

The invention relates to a method for purifying water, for example water used for forming a water curtain of a wet spray wall in paint spray and/or glue processing booths, wet dust removal plants and the like, whereby the water to be purified is caught in a receptacle and the water is sucked out under the surface of the water present in said receptacle, mixed with air and introduced into a basin at the bottom side of said basin, wherein the water mixed with air is introduced into a basin which widens in upward direction, and that contaminations floating on the surface of the water present in said basin is pushed towards an outlet disposed near one side of said basin by means of a pusher, whilst the water flows out on the opposite side of the basin via an overflow, which is screened at its side facing the outlet for the contaminations by a partition extending slightly below the water level in the basin.

From DE-U-9313340 there could be derived such a method wherein the water is passed through a basin comprising a lower conical part, a cylindrical middle part and a widening upper part whereby in the bath there have not been provided means obstructing the upward flow of the water.

U.S. Pat No. 4,610,785 discloses a method and a device of this kind, wherein the water is injected through a pipe in the longitudinal direction of a trough-shaped bottom end of the basin, in such a manner that the water collides with a partition disposed in the basin at some distance from the end of said pipe, as a result of which the water is imparted a turbulent motion about an imaginary axis extending horizontally and perpendicularly to the longitudinal direction of said pipe. The discharge of the water takes place through a discharge channel located on one side of the basin, which is separated from the other part of the basin by a partition, the bottom edge of said partition being located a short distance above the supply pipe.

In practise it has become apparant the primarily heavier particles, the slightly larger, more crystalline particles, will thereby float on the water surface, whilst the lighter particles, the smaller, more colloidal particles, are carried towards the outlet by the water as a result of the strong turbulent flow of the water, so that an adequate purification of the water casu quo separation of particles is not obtained.

From EP-A-0,065,382 a method and a device for purifying water can be derived wherein part of the contaminated water is introduced in a basin near the upper side of said basin and another part of the water is introduced into said basin near the bottom side thereof. The contaminations floating on the water surface are thereby swept out of the basin near one side thereof, whilst a discharge pipe for the discharge of water from the basin is connected to the basin near the same side thereof. Also here the introduction of contaminated water in two places causes a strong turbulence of the water in the basin, as a result of which an adequate separation in particular of light particles from the water can not be effected. Furthermore the aimed-at separation between liquid and particles is made more difficult because the discharge of water from the basin and the discharge of particles floating on the water take place in places located in close proximity to each other.

The method according the invention is characterised in that in the lowermost part of the basin which widens up along the entire length of its height the water is passed through perforated plates being disposed one above the other and after passing said screens the water is passed into an upper part of the basin where the increase of the cross-section measured in a horizontal direction per unit of height is greater as in the lowermost part of the basin.

When using a method according to the invention a very gradual rising of the air divided into fine air bubbles in the liquid is obtained, as a result of which contaminations are effectively driven towards the surface, whereby, as has become apparent in practice, also contaminations in the form of paint traces and/or other types of contamination will float on the water surface and be discharged on one side of the device. Since there is no generation of a strong turbulence near the partition disposed before the overflow, which partition extends only slightly below the level of the water present in the basin, the risk of contamination in particles being swept along by the water flowing out is largely avoided.

Another aspect of the invention relates to a device for purifying water, for example water used for forming a water screen in a paint spray and/or glue processing booth, whereby said device is provided with a receptacle for the water, in which at least one suction means is disposed, which is connected to the suction side of a pump, whilst a venturi is provided between the pump and the suction means for mixing the intake water with air and the delivery side of the pump is connected to the bottom side of a basin, said basin on one side, near the upper side, being provided with an outlet for the discharge of contaminations floating on the water present in the basin, whilst an overflow for the discharge of water from the basin is disposed near the side remote from said outlet and the overflow is separated from the remaining part of the basin by a partition extending slightly below the water level during normal operation. According to the invention a few perforated plates being disposed one above the other are thereby provided in the basin, whose sectional area gradually increases in upward direction.

By using a device of this type a very uniform movement and distribution of the air bubbles rising towards the surface in the basin is obtained as a result of the gradually increasing, in upward direction, sectional area of the basin in conjunction with the perforated plates, as a result of which contaminations present in the liquid are effectively caused to rise to the surface, so that said contaminations will float on the water surface and be discharged from there, whilst the outflow of the purified water will not cause any undesirable turbulence in the liquid present in the basin.

The invention will be explained in more detail hereafter with reference to an embodiment of the device according to the invention diagrammatically illustrated in the accompanying figures.

FIG. 7 is a diagrammatic view of a strickling mechanism.

FIG. 8 is a larger-scale view of a part of a scraper of the strickling mechanism.

Figure 1:
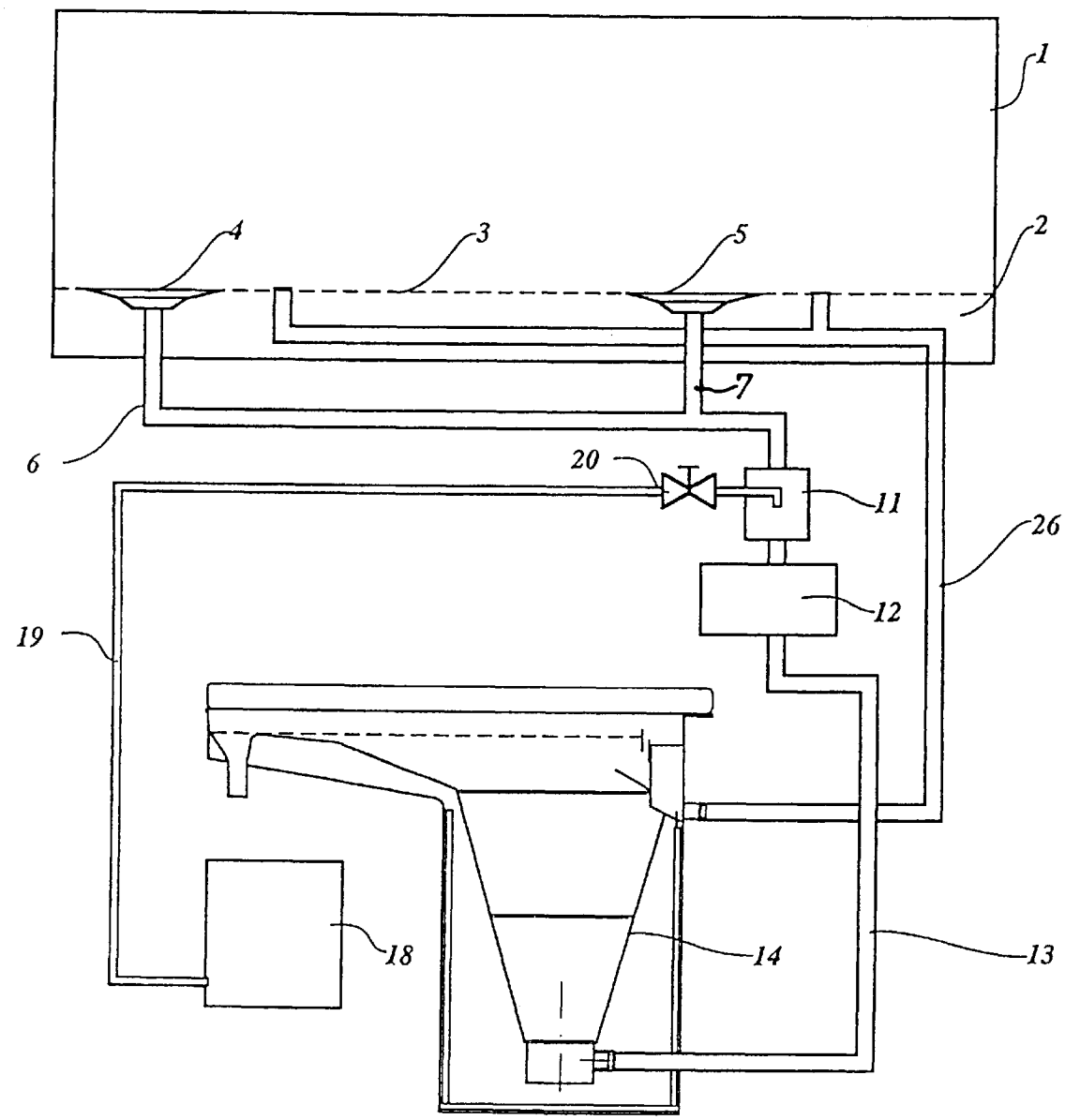
FIG. 1 is a diagrammatic representation of the device according to the invention.

FIG. 1 diagrammatically indicates a wall 1, for example a wall of a spray booth, along which a water screen consisting of water flowing from the upper side of said wall to the bottom side thereof is formed, in a manner known per se, during operation.

Said water is caught in a receptacle 2 disposed near the bottom side of the screen, wherein the water level will be as indicated by dotted line 3 during normal operation.

In the illustrated embodiment two suction funnels 4 and 5 are disposed in receptacle 2, to which suction stubs 6 and 7 respectively are connected.

Figure 2:
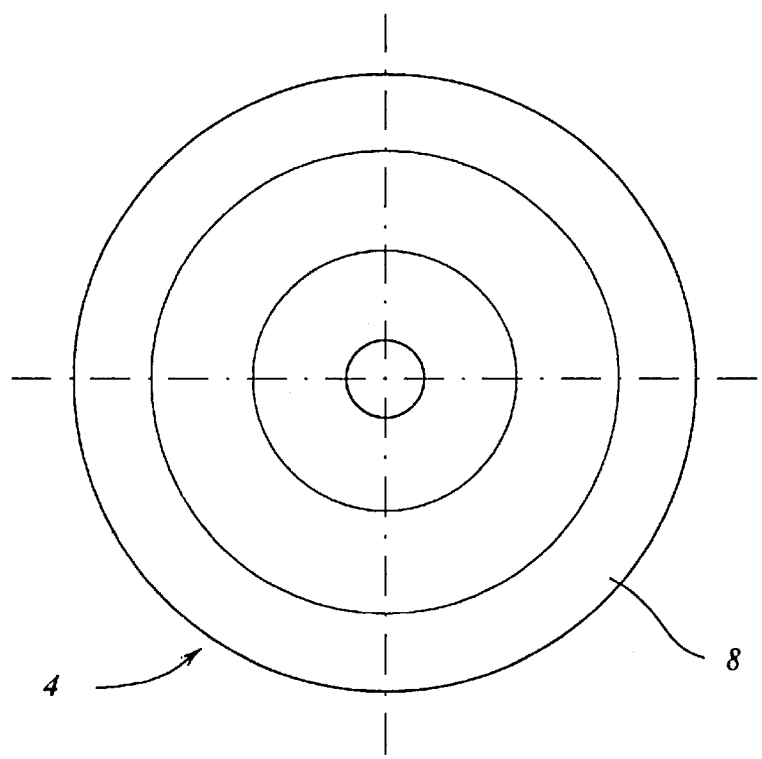
FIG. 2 is a plan view of one embodiment of a suction funnel.
Figure 3:
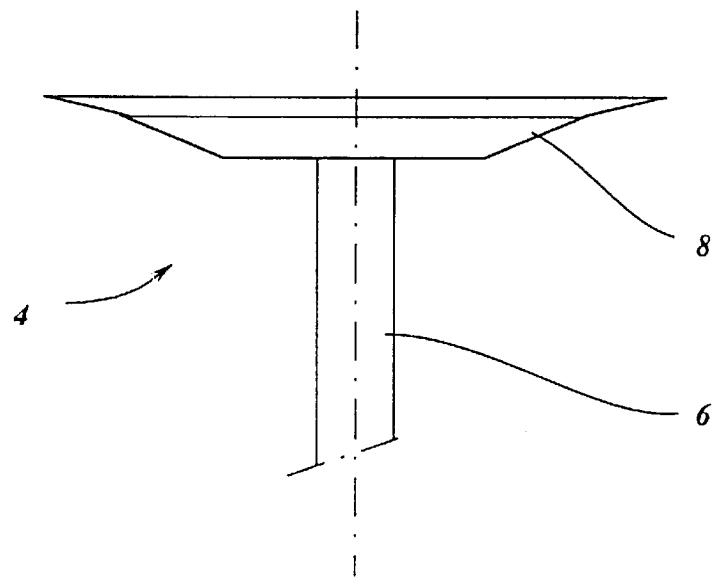
FIG. 3 is a side view of FIG. 2.

As is shown in FIGS. 2 and 3, such a suction funnel may consist of a circular, dish-shaped means 8, to the bottom of which a suction stub may be connected.

Figure 4:
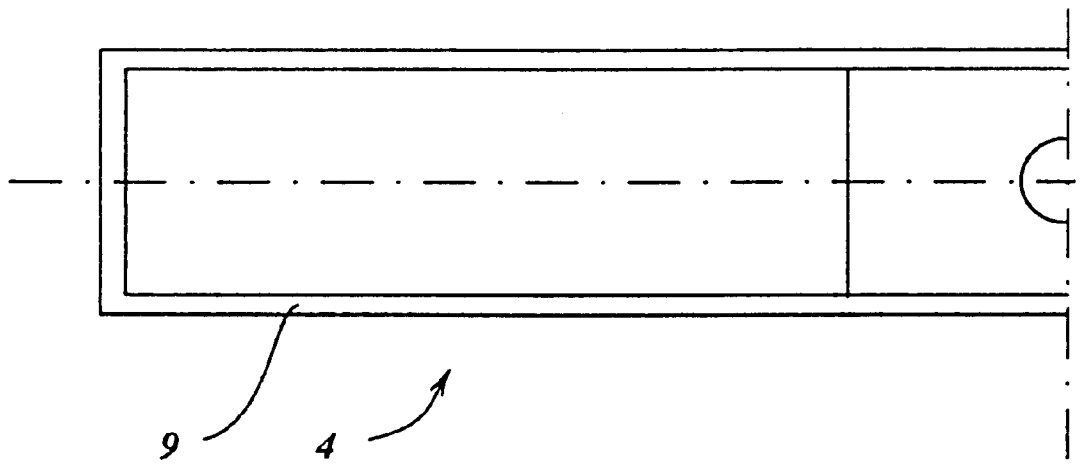
FIG. 4 is a plan view of another possible embodiment of a suction funnel, only half of which is shown in this figure.
Figure 5:
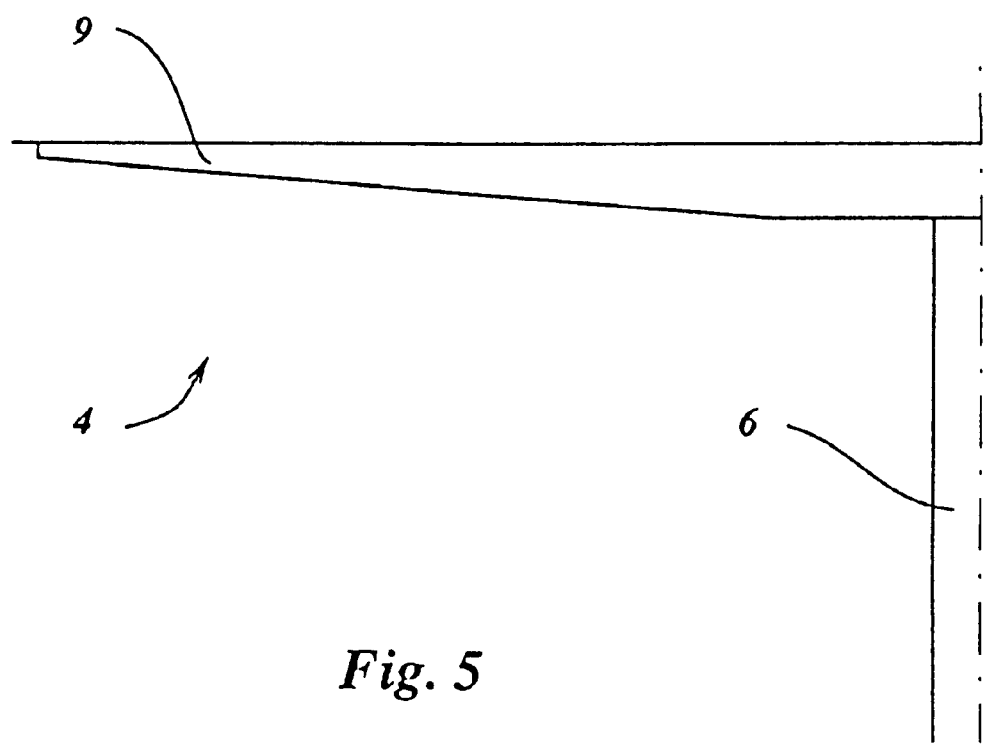
FIG. 5 is a side view of FIG. 4.

As is shown in FIGS. 4 and 5, such a suction funnel may also consist of an elongated rectangular trough 9, however, whereby the suction stub will also be connected to the lowest point of the bottom of said trough. Thus various forms and dimensions of the suction funnel will be possible, inter alia depending on the shape of the receptacle and/or the required capacity of the suction funnel.

Said suction funnels 4 and 5 are connected, via suction stubs 6 and 7, to a line 10, which is in communication with the suction side of a pump 12 via a venturi 11. The size, arrangement and dimensions of said venturi depend on the purpose for which the venturi is used. Connected to the delivery side of the pump is a line 13, which connects the pump 12, possibly via provisions for the injection and mixing of chemicals which may have a positive effect on the process, to a stub 15 (FIG. 6) connected to the bottom end of a basin 14, in which stub a non-return valve (not shown) is incorporated in order to prevent water from flowing back out of the basin.

Figure 6:
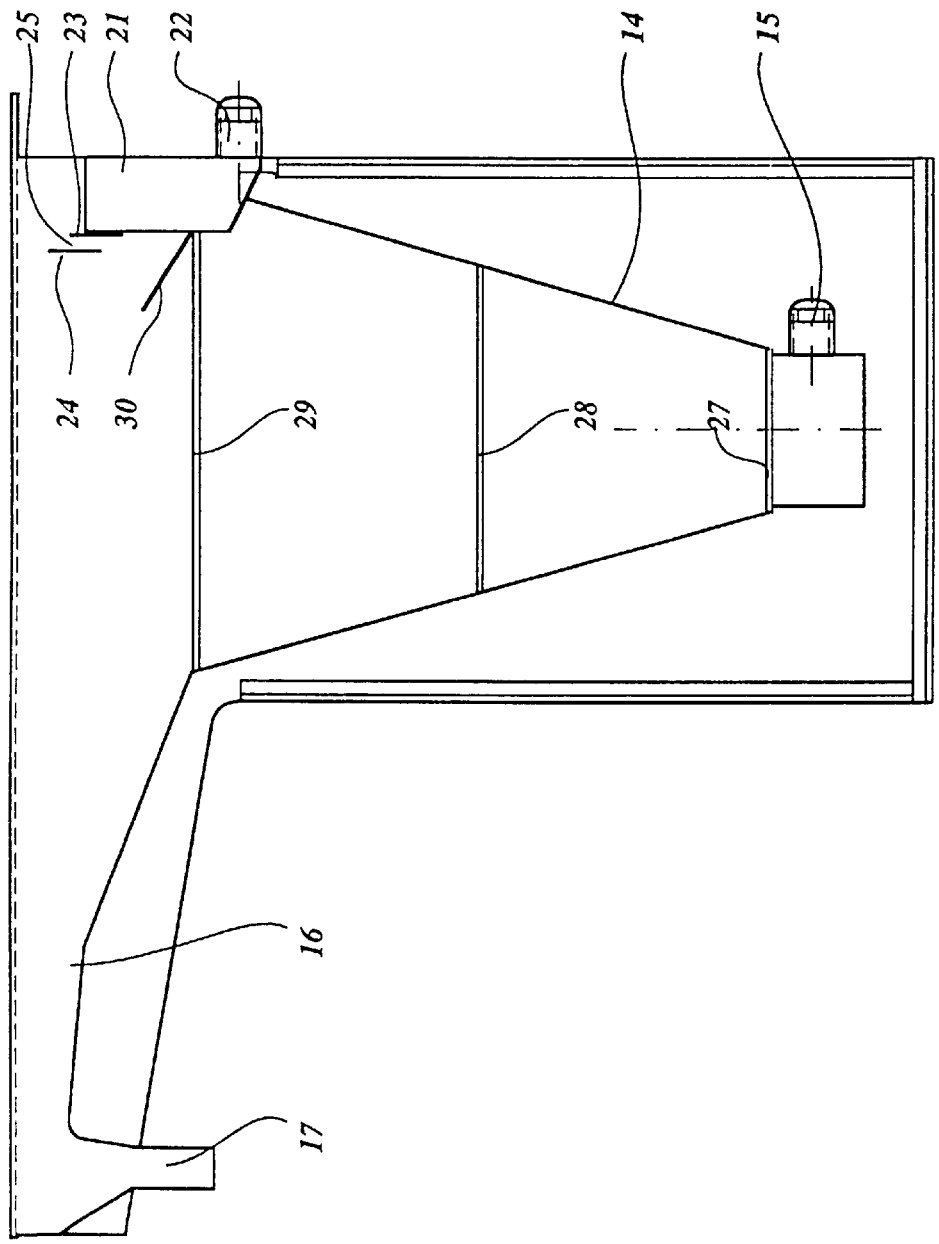
FIG. 6 is a larger-scale, diagrammatic view of the basin of the device according to the invention.

As will be apparent in particular from FIG. 6, the sectional area of the basin gradually increases from the bottom to the top, whilst the sectional area of the basin increases strongly, in particular near the upper side of the basin, as a result of the presence of a wall part 16 of the basin, which extends to the left, seen in FIG. 6, and which includes a comparatively small angle (less than 30°) with the horizontal. Connected to the left-hand end of said wall 16 part is an outlet line 17, which opens above a filtering device 18 (FIG. 1).

A filtering bag (not shown) is disposed within said filtering device 18, in which filtering bag contaminations discharged along with water via discharge line 17 are caught. Filtering unit 18 is furthermore connected to venturi 11 via a line 19, which is fitted with a cock 20.

A discharge bin 21 is disposed near the right-hand upper side of the basin, seen in FIG. 6, to which discharge bin a discharge stub 22 is connected (FIG. 6).

The discharge bin 21 is bounded by a vertically adjustable partition 23 forming an overflow, by means of which the water level in basin 14 can be determined.

A partition 24 extending parallel to partition 23 is fixedly disposed in the basin, said partition 24 being spaced from partition 23 by a short distance. During normal operation the bottom side of said partition will extend under the water surface and thereby prevent contaminations floating on the water from flowing into the discharge bin 21 via channel 25, which is bounded by the two partitions 23 and 24.

A strickling mechanism to be described hereafter with reference to FIGS. 7 and 8 is disposed near the upper side of the basin, said strickling mechanism comprising a scraper or pusher means, which will push contaminations floating on the water present in the basin in the direction of the discharge line or outlet 17 during its movement in the direction of discharge line 17, whilst the scraper will have been moved to a position above the water level during its return movement towards the discharge channel 25.

The discharge stub 22 is in turn connected to receptacle 2 via one or more return lines 26.

As is furthermore apparent from FIG. 6, perforated plates 27–29 comprising passages having a diameter of 20, 15 and 10 mm respectively may be provided at different levels in the basin 14, depending on the intended use and the capacity.

If desired an agent may be added to the water to prevent the contamination particles, for example paint particles if used with a spray booth, from bonding strongly together, as a result of which addition the contaminative particles will be more inclined to remain afloat on the surface of the water in receptacle 2.

The contaminated upper layer may now be sucked from receptacle 2 via the discharge funnels 4 and 5, by operating pump 12. Pump 12 may thereby be disposed at a higher level than discharge funnels 4 and 5, so that the water from the discharge funnels cannot flow to pump 12 under the influence of gravity, or the capacity of pump 12 in proportion to the passage of lines 6, 7 and 10 may be such that even if pump 12 is disposed at a lower level than the discharge funnels 4 and 5, the sub-atmospheric pressure being generated is still sufficiently strong to cause the discharge funnels 4 and 5 to be emptied alternately. As a result of the sub-atmospheric pressure being generated water and air will first be drawn in at a first discharge funnel, whilst the other funnel, if emptied before, will fill up thereby.

This effect can be influenced positively by making the diameter of the passage of the end of line 7 connected to discharge funnel 5 smaller (for example 15 mm) than that of the passage of the end of line 6 connected to the other discharge funnel 4 (for example 22 mm).

As soon as the former funnel has been emptied, the sub-atmospheric pressure at the second funnel will be greater than at the first funnel, as a result of which the second funnel will be emptied, whilst the former funnel will fill up again in the meantime.

Figure 9:
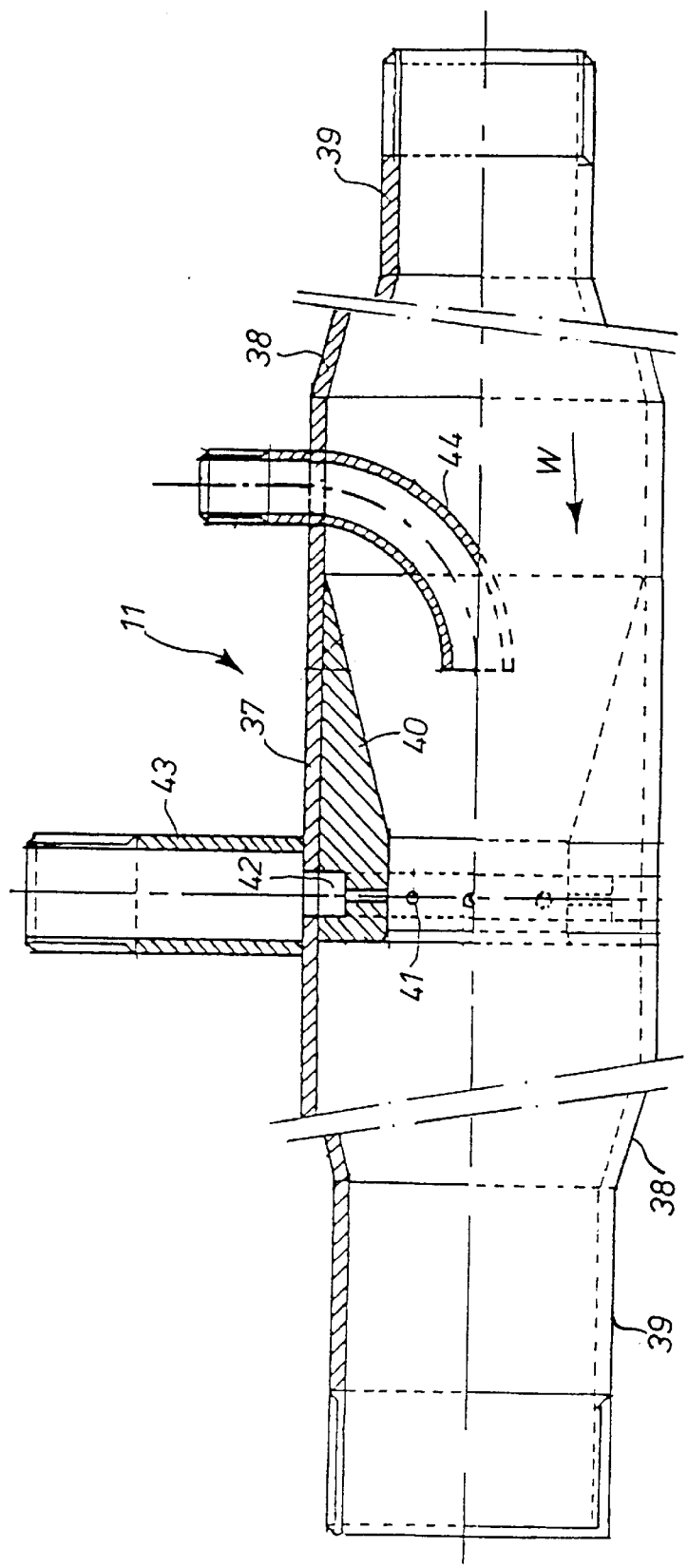
FIG. 9 is a sectional view of a venturi to be used in the device according to the invention.

The water drawn in by pump 12 is passed through the venturi (shown in FIG. 9) disposed upstream of said pump, whereby the water moves through said venturi in the direction according to arrow W.

Venturi 11 is built up of a tube 37, which is connected to stubs 39 via conical connecting pieces 38, so as to be connected to the lines being in communication with discharge stubs 6 and 7 and pump 12 respectively.

An annular insert piece 40 is provided in tube 37. As is apparent from FIG. 9, the diameter of the passage in said insert piece gradually becomes smaller in downstream direction. Radial bores 41 are provided in the insert piece, near the narrowest part of the passage, said bores connecting the passage to a circular groove 42 provided in the outer circumference of the insert piece 40. Groove 42 is in communication with a stub 43, through which air can be drawn in during operation. An adjustable shut-off valve or the like may be provided on stub 43 so as to influence the air flow through stub 43.

Directly downstream of the narrowest part of the insert piece 40, which is provided with air supply passages 41, the diameter of the passage increases again to the internal diameter of line 37.

Upstream of the stub 43 a bent connecting pipe 44 is provided in the venturi. One end of the connecting pipe projects outside the venturi and is intended for connection to line 19. Inside the venturi said connecting pipe 44 is bent in downstream direction, whereby the free end of the tube is located in the passage of the insert piece 40.

The capacity of pump 12, which is preferably a centrifugal pump with a semi-open or closed impeller, is such that a strong sub-atmospheric pressure can be generated in venturi 11 during operation.

As a result of the strong sub-atmospheric pressure in the venturi both water and air will be drawn in and be mixed thoroughly, in such a manner that the water will contain a large amount of fine air bubbles. Said mixing is intensified by the sudden increase of the diameter of the passage for the liquid behind the narrowest part of the venturi.

The contaminated water drawn in by means of pump 12 and mixed with air is pumped into the bottom side of basin 14 via line 13, preferably in such a manner that the water is imparted a turbulent motion about an imaginary vertical axis. The contaminated water will gradually rise in said basin. The successive perforated plates 27–29 will thereby cause the water to flow upward in the basin in a gradual, calm manner, whereby the contaminations are pushed upward by the mixture of water and air and will float on the water in the basin. As a result of the large taper bounded by wall 16 at the upper side of the basin in the direction of the discharge pipe the rising water and contaminations will be inclined to flow in the direction of the discharge line, as a result of which the contaminations are slightly pushed in the direction of discharge line 17 already, whilst clean water can flow from the basin via discharge channel 25. As is shown in FIG. 6 a diversion plate 30, which diverts the rising water in the direction of discharge line 17, may furthermore be disposed under discharge channel 25 in order to prevent contamination particles from moving in the direction of said discharge channel 25.

The contamination particles in the water discharged via line 17 are caught in a filtering unit provided within the filter housing 18. The water passing through said filtering unit will be drawn in by pump 12 through line 19 and venturi 11.

A mixing of air and water is effected not only via venturi 11 but also when water is being drawn in via discharge funnels 4 and 5, which has a positive effect on the separation of contamination particles.

The water flowing from basin 14 via discharge chamber 21 is returned to receptacle 2 via line 26, whereby the water, which is still mixed with air, thus flowing into receptacle 2 will cause some stirring of the water present in receptacle 2, as a result of which contamination particles, which tend to settle in receptacle 2, will be driven upward to the surface of the receptacle, in order to be discharged from there.

The water may furthermore be drawn in from receptacle 2 by means of a pump (not shown), and be used in a usual manner again for forming the water curtain flowing along wall 1.

The filter may be replaced by a clean filter at regular intervals, whilst the fouled filter may be cleaned and/or be discharged and for example be incinerated.

As is diagrammatically shown in FIG. 7, the scraping mechanism may be provided with an adjusting means, for example in the shape of a so-called belt cylinder 31, by means of which a slide 32 can be moved to and fro, as is indicated by means of arrow A. A scraper or pusher means 34 is coupled to slide 32 by means of a pivot pin 33 extending horizontally parallel to the water surface 3. It will be apparent that said pusher means 34 consisting of an elongated plate-shaped member will extend over at least substantially the entire width of the basin.

As is shown in more detail in FIG. 8, a rubber strip 35 may be secured to the underside of pusher means 34.

Pusher means 34 can be pivoted with respect to said slide by means of a setting cylinder 36 between the position shown in FIG. 7, in which the bottom end of said pusher means, in particular the rubber strip 35, extends below the water surface 3, and a pivoted position, in which said pusher means will be entirely located some distance above the water surface 3.

Although the invention has been described above in particular with regard to purifying water used in painting units and the like, it will be apparent that the method and the device may also be used for treating liquids contaminated in a different manner. Instead of air it will also be possible thereby to draw in a suitable gas, if desired.

Of course further modifications and additions to the above-described device are conceivable.

Thus it is possible to dispose devices intended for filtering out coarse pieces or parts which cannot be caused to rise in the basin in the above-described manner between receptacle 2 and basin 14.

Another possibility is to dispose suitable equipment for re-treatment of the water to be fed back between discharge stub 22 and receptacle 2. Furthermore means for the automatic process control, data logging and/or telemetry elements may be connected to the device.

I claim:

1. A method for purifying water, comprising:

collecting the water to be purified in a receptacle;

sucking a portion of the water out from under a surface of the water present in said receptacle;

mixing the portion of the water with air; introducing the mixture into a basin at a bottom side of said basin, the basin widening in upward direction and including a pusher, such that contaminations floating on the surface of the water present in said basin are pushed towards an outlet disposed near one side of said basin by the pusher, whilst the water flows out on an opposite side of the basin via an overflow, the overflow being screened at a side facing the outlet from the contaminations by a partition extending slightly below the water level in the basin; and passing the mixture through a plurality of perforated plates disposed in the basin one above the other to an upper part of the basin, the upper part of the basin having a cross-section greater than that of a lowermost part of the basin.

2. A method according to claim 1, wherein said sucking the portion of the water from the receptacle is effected in such a manner that air is sucked in along with the water near the water surface in the receptacle.

3. A method according to claim 1 or 2, wherein the water to be supplied to the basin is passed through a venturi having at least one air supply line connected thereto.

4. A device for purifying water comprising:

a pump having a suction side and a delivery side;

a receptacle for the water having at least one suction means disposed therein and connected to the suction side of the pump;

a venturi provided between the pump and the at least one suction means for mixing the water with air;

a basin having a bottom end connected to the delivery side of the pump, said basin having on an upper side an outlet for the discharge of contaminations floating on the water present in the basin and an overflow for the discharge of water from the basin, the overflow disposed near a side remote from said outlet and separated from the remaining part of the basin by a partition extending slightly below the water level during normal operation; and a plurality of perforated plates disposed one above the other in the basin whose sectional area gradually increases in upward direction.

5. A device according to claim 4, wherein each of the perforated plates has a different aperature diameter, the aperture diameter of a particular plate being larger than the aperture diameter of a plate positioned at a higher level.

6. A device according to claim 4 or 5, further comprising a diversion plate disposed a distance below said overflow, said diversion plate diverting an upward flow in the direction of the outlet for the contaminations.

7. A device according to claim 4 or 5, wherein said venturi has a narrowest passage, which is circumferentially provided with regularly distributed air supply holes, and a line portion having a larger diameter than the narrowest passage, said line portion located directly downstream of said narrowest passage of said venturi.

8. A device according to claim 4 or 5, wherein said basin is bounded near an upper side by a wall part sloping upwards in the direction of the outlet, said wall part including a small angle with the horizontal.

9. A device according to claim 4 or 5, wherein said overflow is bounded by a vertically adjustable means, which may be used to adjust the water level within said basin.

10. A device according to claim 4 or 5, wherein said receptacle included at least two suction funnels, and wherein the pump generates a sub-atmospheric pressure near said suction funnels to empty the suction funnels alternately.

11. A device according to claim 10, wherein said suction funnels are connected to said pump via lines having different diameters.

12. A device according to claim 4 or 5, further comprising a filtering device connected to said outlet for the contaminations, and wherein said pump includes a suction pipe connected to said filtering device.

13. A device according to claim 12, wherein said suction pipe is connected to the venturi via which said pump draws in water from said receptacle.

14. A device according to claim 4 or 5, further comprising a pusher means disposed in said basin, said pusher means capable of reciprocating movement over said basin in order to push contaminations floating on the water in the basin in the direction of said outlet.

15. A device according to claim 14, wherein said pusher means is coupled to a slide being capable of reciprocating movement, with respect to which said pusher means can pivot about a horizontal pivot pin.

16. A device according to claims 4 or 5, further comprising means for regulating the through-flow of water upstream of said venturi, said regulating means provided between said venturi and said receptacle.

17. A device according to claims 4 or 5, further comprising means for regulating the amount of air drawn in per time unit by the venturi during operation.

18. A device according to claims 4 or 5, further comprising means for introducing and/or mixing chemical agents having a positive influence on the treatment of the water, said introducing and/or mixing means provided in the supply line to said basin.

19. A device according to claim 4 or 5, further comprising a plurality of devices for filtering out coarse pieces and the like, said devices disposed between said receptacle and said basin.

20. A device according to claim 4 or 5, further comprising a suitable equipment for retreatment of the water to be fed back, said suitable equipment provided between a discharge stub of said basin and said receptacle.

21. A device according to claim 4 or 5, further comprising means for automatic process control, data logging and/or telemetry elements.

* * * * *